US012691768B2

(12) United States Patent
Lu

(10) Patent No.: US 12,691,768 B2
(45) Date of Patent: Jul. 28, 2026

(54) SELF-DRIVING DEVICE SYSTEM AND CHARGING STATION

(71) Applicant: Nanjing Chervon Industry Co., Ltd., Nanjing (CN)

(72) Inventor: Zhijian Lu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 1023 days.

(21) Appl. No.: 17/854,028

(22) Filed: Jun. 30, 2022

(65) Prior Publication Data

US 2023/0010274 A1     Jan. 12, 2023

(30) Foreign Application Priority Data

Jul. 12, 2021    (CN) ......................... 202110785029.5

(51) Int. Cl.
| | |
|---|---|
| *B60L 53/00* | (2019.01) |
| *A01D 34/00* | (2006.01) |
| *A01D 101/00* | (2006.01) |
| *B60L 50/60* | (2019.01) |
| *H02J 7/50* | (2026.01) |
| *H02J 7/70* | (2026.01) |

(52) U.S. Cl.
CPC ............... *B60L 53/00* (2019.02); *B60L 50/60* (2019.02); *H02J 7/50* (2026.01); *H02J 7/70* (2026.01); *A01D 34/008* (2013.01); *A01D 2101/00* (2013.01); *B60L 2200/40* (2013.01); *B60L 2210/30* (2013.01); *H02J 2207/20* (2020.01)

(58) Field of Classification Search
CPC ...... B60L 53/00; B60L 50/60; B60L 2200/40; B60L 2210/30; H02J 7/0042; H02J 2207/20; H02J 2207/40

USPC .......................................... 320/107, 114, 115
See application file for complete search history.

(56) References Cited

U.S. PATENT DOCUMENTS 7,728,534 B2 * 6/2010 Lucas .................. A01D 69/025
318/599

FOREIGN PATENT DOCUMENTS

| CN | 105467983 | A | 4/2016 |
|---|---|---|---|
| CN | 108781704 | A | 11/2018 |
| DE | 212015000289 | U1 | 7/2017 |
| EP | 2082638 | A | 7/2009 |

(Continued)

OTHER PUBLICATIONS

EPO, extended European search report issued on European patent application No. 22181452.8, dated Dec. 2, 2022, 7 pages.

*Primary Examiner* — Richard V Muralidar
(74) *Attorney, Agent, or Firm* — Greenberg Traurig, LLP

(57) ABSTRACT

A self-driving device system includes a self-driving device, a charging station, and an adapter. The self-driving device can automatically walk and operate in a work area. The charging station is configured to charge the self-driving device. The adapter is configured to convert utility power to a low-voltage alternating current and output the low-voltage alternating current to the charging station. The charging station includes at least an input interface and a first output interface. The input interface is configured to connect to the adapter to receive the low-voltage alternating current. The first output interface is configured to output the low-voltage alternating current to the self-driving device. The self-driving device includes a charging interface. The charging interface is configured to receive a low-voltage alternating current.

18 Claims, 4 Drawing Sheets

(56)     References Cited

FOREIGN PATENT DOCUMENTS

| | | | | |
|---|---|---|---|---|
| EP | 3703218 | A1 | | 9/2020 |
| WO | 2019080935 | A1 | | 5/2019 |
| WO | 2020/114415 | A1 | | 6/2020 |
| WO | WO 2020114415 | | * | 6/2020 |

* cited by examiner

SELF-DRIVING DEVICE SYSTEM AND CHARGING STATION

This application claims the benefit under 35 U.S.C. § 119(a) of Chinese Patent Application No. CN 202110785029.5, filed on Jul. 12, 2021, which application is incorporated herein by reference in its entirety.

BACKGROUND

In general, a self-driving device, such as a mower, is provided with an operation handle for pushing. The operation handle is provided with a control mechanism at a position adjacent to a holding portion to facilitate operation and control by an operator. The mower moves on the ground and performs a cutting operation by relying on a thrust applied by the operator to the operation handle. The operator operates such a push-type mower with a very high labor intensity. With the continuous development of artificial intelligence, self-walking mowers have been developed. Since mowers can automatically walk and perform related tasks set in advance without manual operation and intervention, manpower and material resources are greatly saved, thereby bringing convenience to operators.

The advent of self-driving devices has brought great convenience to users, releasing users from heavy gardening care work. An existing self-driving device system, such as an intelligent mower system, includes a charging station and a boundary line. The charging station is placed on the ground. The boundary line is connected to the charging station. A work area is surrounded by the boundary line to make an intelligent mower walk automatically in the work area to cut grass. After the charging station receives utility power, the received voltage needs to be converted, and the converted direct current is supplied to charge the self-driving device. In this case, the charging station needs to be provided with a series of voltage conversion circuits. Only after a series of conversions of the input voltage are performed can the input voltage be output to the self-driving device to charge the battery sets. That is, the intermediate links are relatively complex. As a result, the production cost of the charging station is relatively high.

SUMMARY

A self-driving device system includes a self-driving device, a charging station and an adapter. The self-driving device is capable of automatically walking and operating in a work area. The charging station is configured to charge the self-driving device. The adapter is configured to convert utility power to a low-voltage alternating current and output the low-voltage alternating current to the charging station. The charging station includes at least an input interface and a first output interface. The input interface is connected to the adapter and configured to receive the low-voltage alternating current output by the adapter. The first output interface is connected to the self-driving device and configured to output the low-voltage alternating current to the self-driving device. The self-driving device includes at least a charging interface. The charging interface is connected to the first output interface of the charging station to receive the low-voltage alternating current.

In one example, the input interface of the charging station is electrically connected to the first output interface of the charging station by a printed circuit board (PCB).

In one example, the self-driving device further includes a charging power circuit. The charging power circuit is connected to the charging interface to convert the low-voltage alternating current to a low-voltage direct current.

In one example, the self-driving device further includes a charging output interface and a battery set. The charging output interface is connected to the charging power circuit to output the low-voltage direct current and configured to charge the battery set of the self-driving device.

In one example, the self-driving device further includes the battery set. The battery set is configured to provide electrical energy for the self-driving device and includes one or more pluggable battery packs. The one or more pluggable battery packs are capable of providing a source of energy for other power tools.

In one example, the self-driving device further includes a charging control module. The charging control module is configured to adjust the input voltage and the output voltage of the charging power circuit to adapt the battery set.

In one example, the charging power circuit includes at least a rectifier circuit and a filter circuit.

In one example, the rectifier circuit includes at least a rectifier bridge. The filter circuit includes at least an electrolytic capacitor.

In one example, the adapter includes an alternating current input interface, a transformer isolation circuit and a low-voltage alternating current output interface.

In one example, the transformer isolation circuit includes at least one of a switching power supply or an isolation transformer.

In one example, the low-voltage alternating current output interface is electrically connected to the input interface of the charging station and configured to output the low-voltage alternating current to the charging station.

In one example, the low-voltage alternating current may be one of a square wave alternating current, a sinusoidal alternating current or a modified sine wave alternating current.

In one example, the range of the voltage value of the low-voltage alternating current is set to be greater than or equal to 20 V and less than or equal to 60 V.

In one example, the self-driving device system further includes a boundary line. The boundary line is configured to plan the work area of the self-driving device.

In one example, the charging station further includes a boundary power module and a second output interface. The boundary power module is configured to convert the low-voltage alternating current received by the input interface to a direct current. The second output interface is connected to the boundary power module and configured to output the direct current to supply power to the boundary line.

A self-driving device system includes a self-driving device, a charging station and an adapter. The self-driving device is capable of automatically walking and operating in a work area. The charging station is configured to charge the self-driving device. The adapter is configured to convert utility power to a low-voltage alternating current and output the low-voltage alternating current to the charging station. The charging station includes an input interface and a first output interface. The input interface is connected to the adapter and configured to receive the low-voltage alternating current output by the adapter. The first output interface is connected to the self-driving device and configured to output the low-voltage alternating current to the self-driving device.

In one example, the self-driving device further includes a charging interface, a charging power circuit and a charging output interface. The charging interface is connected to the first output interface of the charging station to receive the low voltage alternating current. The charging power circuit is connected to the charging interface to convert the low-voltage alternating current received by the input interface to a low-voltage direct current. The charging output interface is connected to the charging power circuit to output the low-voltage direct current and configured to supply power to the self-driving device.

In one example, the range of the voltage value of the low-voltage alternating current is set to be greater than or equal to 20 V and less than or equal to 60 V.

A charging station is configured to supply power to a self-driving device. The self-driving device is capable of automatically walking and operating in a work area surrounded by a boundary line. The charging station includes an input interface, a first output interface, a boundary power module and a second output interface. The input interface is configured to receive a low-voltage alternating current output by an adapter. The first output interface is configured to output the low-voltage alternating current received by the input interface to the self-driving device. The boundary power module is connected to the input interface and configured to convert the low-voltage alternating current received by the input interface to a direct current. The second output interface is connected to the boundary power module and configured to output the direct current to supply power to the boundary line.

In one example, the input interface is electrically connected to the first output interface by a printed circuit board (PCB). The first output interface is configured to output a signal received by the input interface to the self-driving device.

DETAILED DESCRIPTION

The present application is described below in detail in conjunction with drawings and embodiments.

Figure 1:
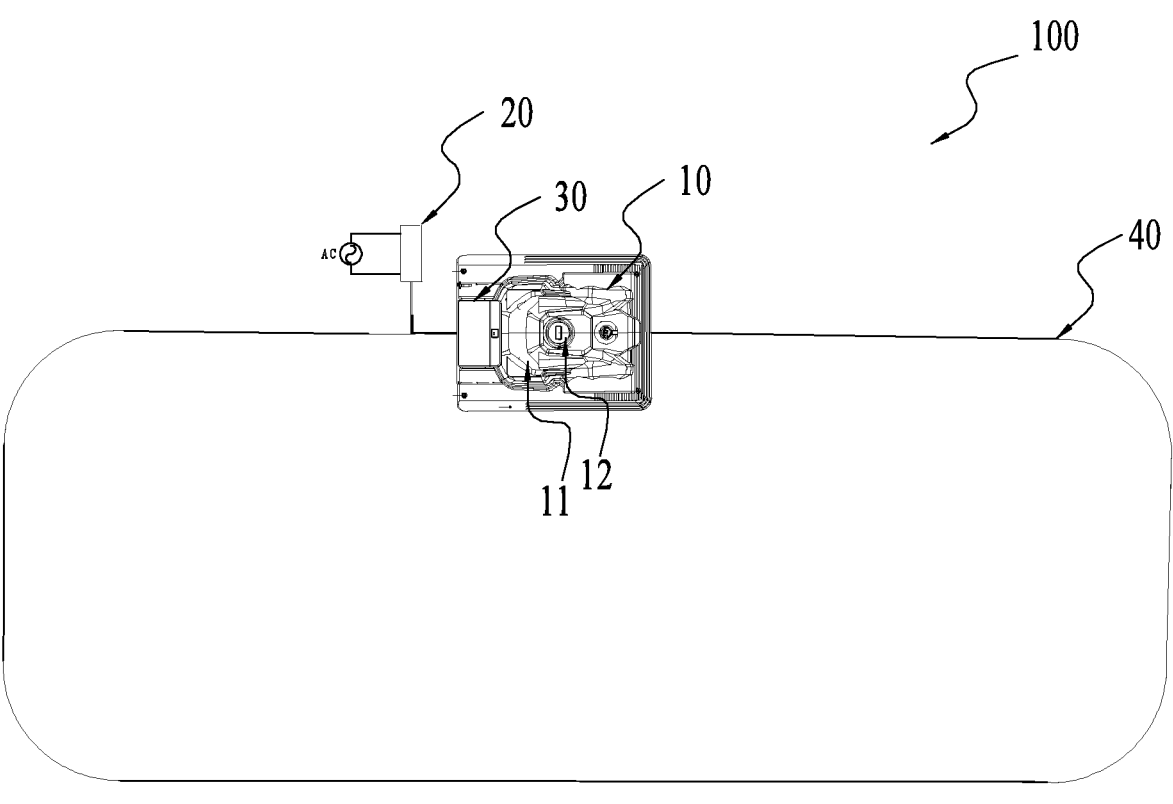
FIG. 1 is a diagram illustrating the structure of a self-driving device system.

FIG. 1 shows a self-driving device system 100 as an embodiment. The self-driving device system 100 includes a self-driving device, an adapter 20, a charging station 30 and a boundary line 40. In the present application, the self-driving device is configured as an intelligent mower 10. It is to be understood that the self-driving device of the present application is not limited to the self-driving device disclosed in embodiments of the present application and may be another self-driving device capable of automatically walking and operating in a work area, for example, a mower or a snowplow.

The intelligent mower 10 includes a housing 11, a battery set 12, a power supply circuit, a walking wheel and a drive module. Specifically, the walking wheel is disposed at the bottom of the housing 11 and can rotate relative to the housing 11. The battery set 12 provides electrical energy for the intelligent mower 10. The battery set 12 is electrically connected to the drive module by the power supply circuit so that the electrical energy output from the battery set 12 is provided for the drive module to drive the intelligent mower 10 walking or mowing.

The intelligent mower 10 further includes a cutting blade for cutting grass or vegetation. Optionally, the drive module includes a walking motor and a cutting motor. The walking motor is used to provide torque for the walking wheel. The cutting motor is configured to provide torque for the cutting blade, thereby driving the cutting blade to rotate to perform the mowing operation. It is to be understood that the drive module may also include only one motor. The motor can drive the walking wheel and the cutting blade simultaneously.

Figure 2:
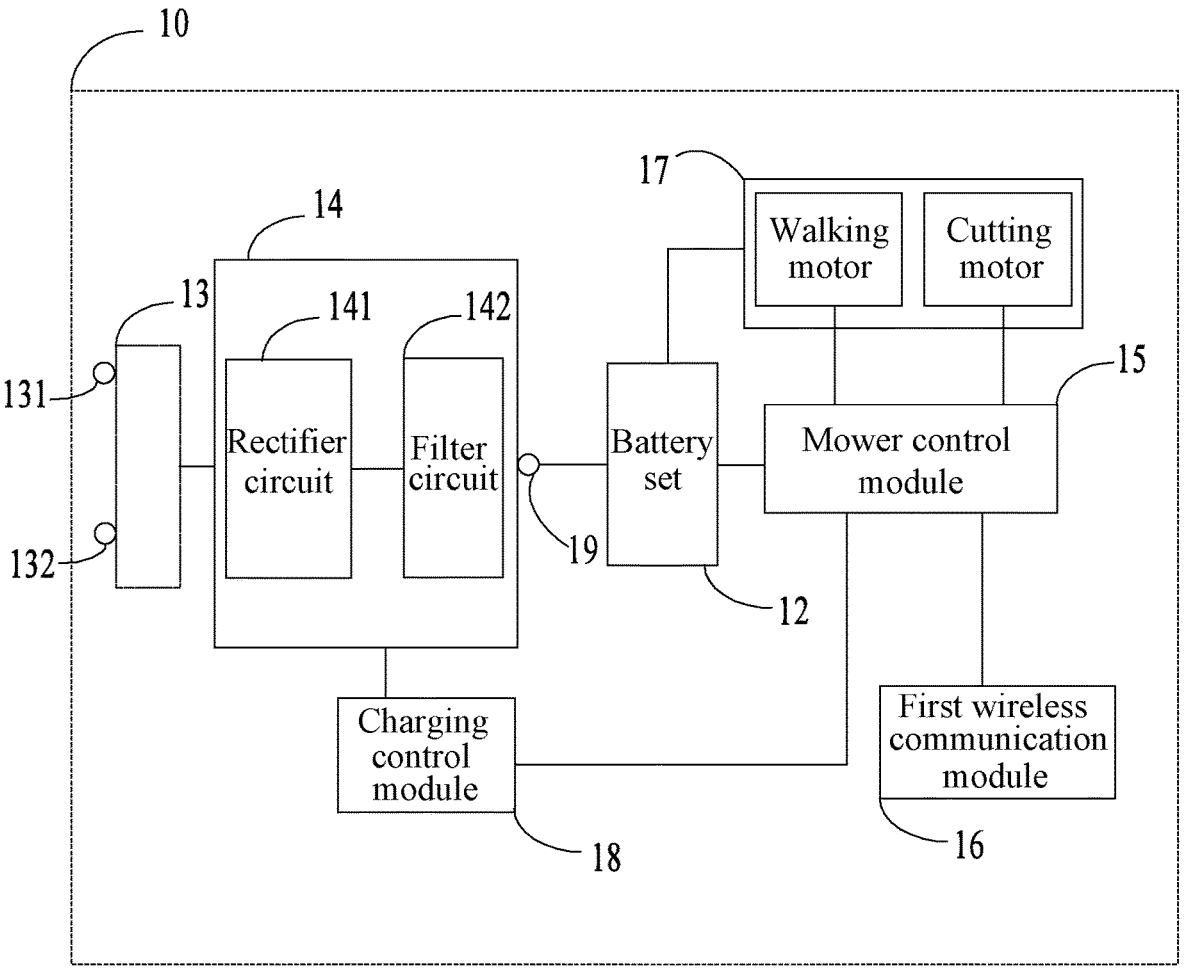
FIG. 2 is a circuit block diagram of a self-driving device of the self-driving device system of FIG. 1.

FIG. 2 shows a circuit block diagram of the intelligent mower 10. The intelligent mower 10 further includes a charging interface 13, a charging power circuit 14, a mower control module 15, a first wireless communication module 16, a drive module 17 and a charging output interface 19.

The charging interface 13 is configured to connect to the charging station 30 to receive electrical energy to charge the intelligent mower 10. A first charging terminal 131 and a second charging terminal 132 are disposed in the charging interface 13.

The charging power circuit 14 is configured to convert the electrical energy from the charging interface 13 to the power supply voltage and power supply current adapted the battery set 12 and output the power supply voltage and power supply current. The charging power circuit 14 is connected to the charging interface 13. In some embodiments, to supply power to the battery set 12, the charging power circuit 14 converts the low-voltage alternating current of the electrical energy from the charging interface 13 to a low-voltage direct current which can charge the battery set 12. In some embodiments, the charging power circuit 14 includes an AC/DC conversion circuit and, in particular, may include a rectifier circuit 141 and a filter circuit 142.

The battery set 12 is configured to provide electrical energy for the intelligent mower 10. Exemplarily, the battery set 12 is at least configured to supply power to the drive module 17. The battery set 12 may supply power to other electronic components or electronic assemblies on the intelligent mower 10, such as the mower control module 15 and the first wireless communication module 16. In some embodiments, the battery set 12 includes one or more pluggable battery packs used for providing a source of energy for the intelligent mower 10. At least one battery pack is configured to provide a source of energy for another power tool. Specifically, one battery set includes a plurality of cell units connected in series, a plurality of cell units connected in parallel, or a plurality of cell units connected in series and in parallel. The voltages of the cell units are 4.2 V.

The mower control module 15 is at least configured to control the cutting motor and/or the walking motor. In some embodiments, the intelligent mower 10 further includes a charging control module 18. The charging control module 18 is configured to adjust the input voltage and the output voltage of the charging power circuit 14 to adapt to the battery set 12. The charging control module 18 is further configured to adjust the input current and the output current of the charging power circuit 14 to adapt to the battery set 12. In some embodiments, the mower control module 15 includes a control chip, such as a microcontroller unit (MCU) or an advanced RISC machines (ARM) chip.

The first wireless communication module 16 is configured to communicate with the charging station 30 to transmit data, information and instructions from the mower control module 15. In some embodiments, the first wireless communication module 16 includes a Wi-Fi communication module. Of course, in other embodiments, the first wireless communication module 16 includes a Bluetooth communication module or a ZigBee communication module, as long as the first wireless communication module 16 can establish wireless connection with the charging station 30 and transmit data, information and instructions.

The boundary line 40 surrounds a work area for planning the intelligent mower 10. The area located in the boundary line 40 is a work area. The area located outside the boundary line 40 is a non-work area.

The charging station 30 is electrically connected to the boundary line 40. Specifically, the charging station 30 generates a boundary signal and sends the boundary signal to the boundary line 40. When the boundary signal flows through the boundary line 40, a magnetic field is generated. Then, the intelligent mower 10 senses the magnetic field and walks in the work area to perform the mowing operation. It is to be understood that the boundary signal is a current signal. The charging station 30 is used for the intelligent mower 10 to return to replenish energy in the case of insufficient energy.

Figure 3:
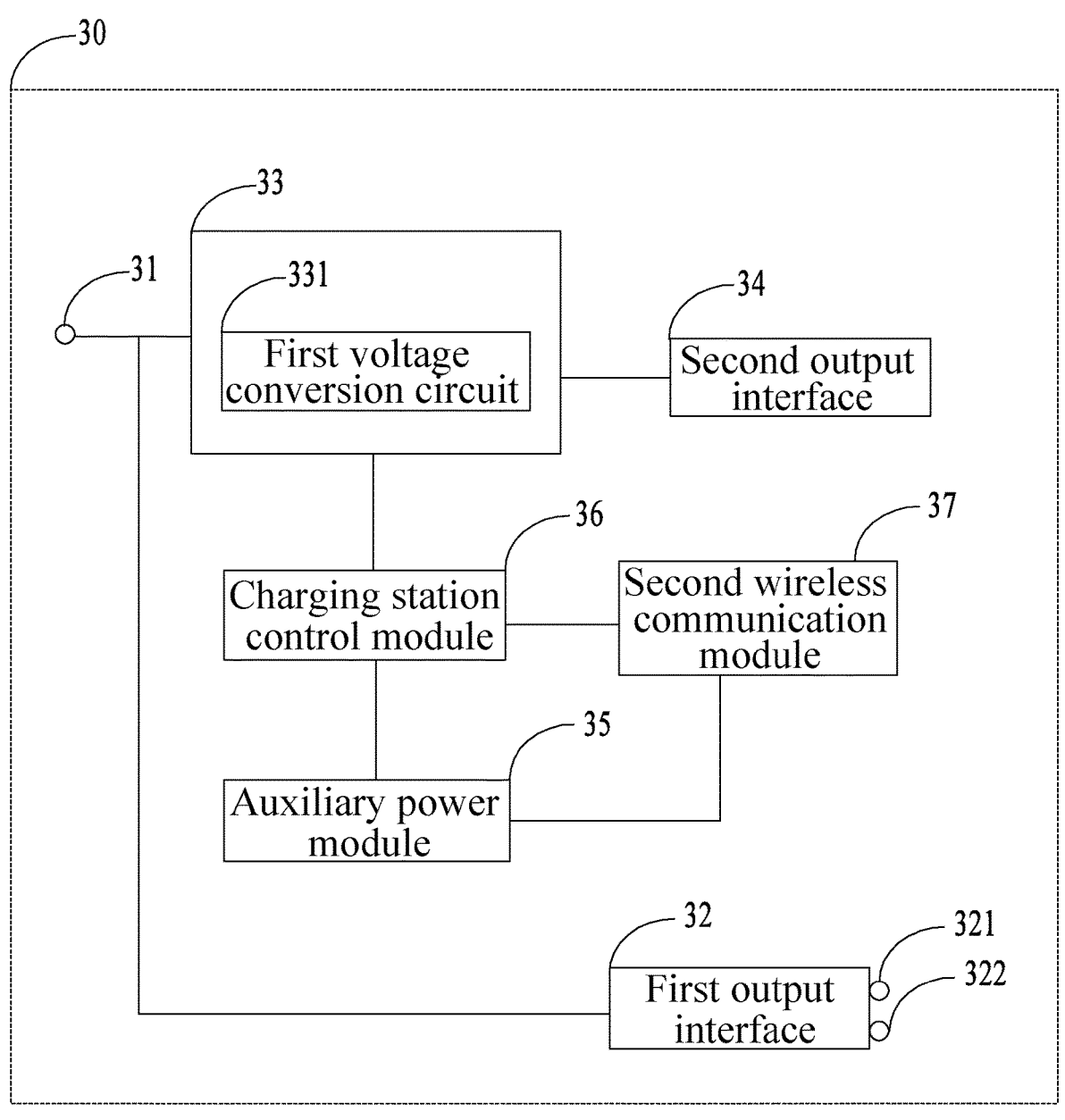
FIG. 3 is a circuit block diagram of a charging station of the self-driving device system of FIG. 1.

FIG. 3 shows a circuit block diagram of the charging station 30. The charging station 30 includes an input interface 31, a first output interface 32, a boundary power module 33, a second output interface 34, an auxiliary power module 35, a charging station control module 36 and a second wireless communication module 37. The second output interface 34 is electrically connected to the boundary line 40 and configured to output a boundary signal to the boundary line 40. The first output interface 32 is configured to connect to the charging interface 13 of the intelligent mower 10 to charge the intelligent mower 10. The input interface 31 is configured to receive electrical energy. Exemplarily, the input interface 31 is electrically connected to the adapter 20.

Specifically, the auxiliary power module 35 is at least configured to supply power to the charging station control module 36 and/or the second wireless communication module 37. The auxiliary power module 35 may also supply power to other electronic components or electronic assemblies on the charging station 30. The auxiliary power module 35 is connected to the input interface 31 to convert the low-voltage alternating current received by the input interface 31 to the power supply voltage adapted to the charging station control module 36 and/or the second wireless communication module 37 and output the power supply voltage. For example, in some embodiments, the auxiliary power module 35 reduces the voltage from the input interface 31 to 15V to supply power to the charging station control module 36 and reduces the power voltage to 3.2 V to supply power to the second wireless communication module 37.

The second wireless communication module 37 is configured to wirelessly communicate with the intelligent mower 10 to transmit data, information and instructions. The second wireless communication module 37 is communicatively connected to the first wireless communication module 16. In some embodiments, the second wireless communication module 37 includes a wireless communication module. Of course, in other embodiments, the second wireless communication module 37 includes a Bluetooth communication module or a ZigBee communication module, as long as the second wireless communication module 37 can establish wireless connection with the charging station 30 and transmit data, information and instructions.

The boundary power module 33 is connected in series between the input interface 31 and the second output interface 34 and configured to convert the low-voltage alternating current received to the input interface 31 to a boundary signal and output the boundary signal. As shown in FIG. 3, the boundary power module 33 includes a first voltage conversion circuit 331. The first voltage conversion circuit 331 is electrically connected to the input interface 31 and is configured to convert the low-voltage alternating current received by the input interface 31 to a direct current for the boundary line 40 to work.

The first output interface 32 is connected to the charging interface 13 of the intelligent mower 10 to transmit electrical energy to the intelligent mower 10 for power supply. The first output interface 32 includes a first output terminal 321 and a second output terminal 322. Specifically, the first output terminal 321 is electrically connected to the first charging terminal 131, and the second output terminal 322 is electrically connected to the second charging terminal 132. In this embodiment, the input interface 31 is directly connected to the first output interface 32.

Figure 4:
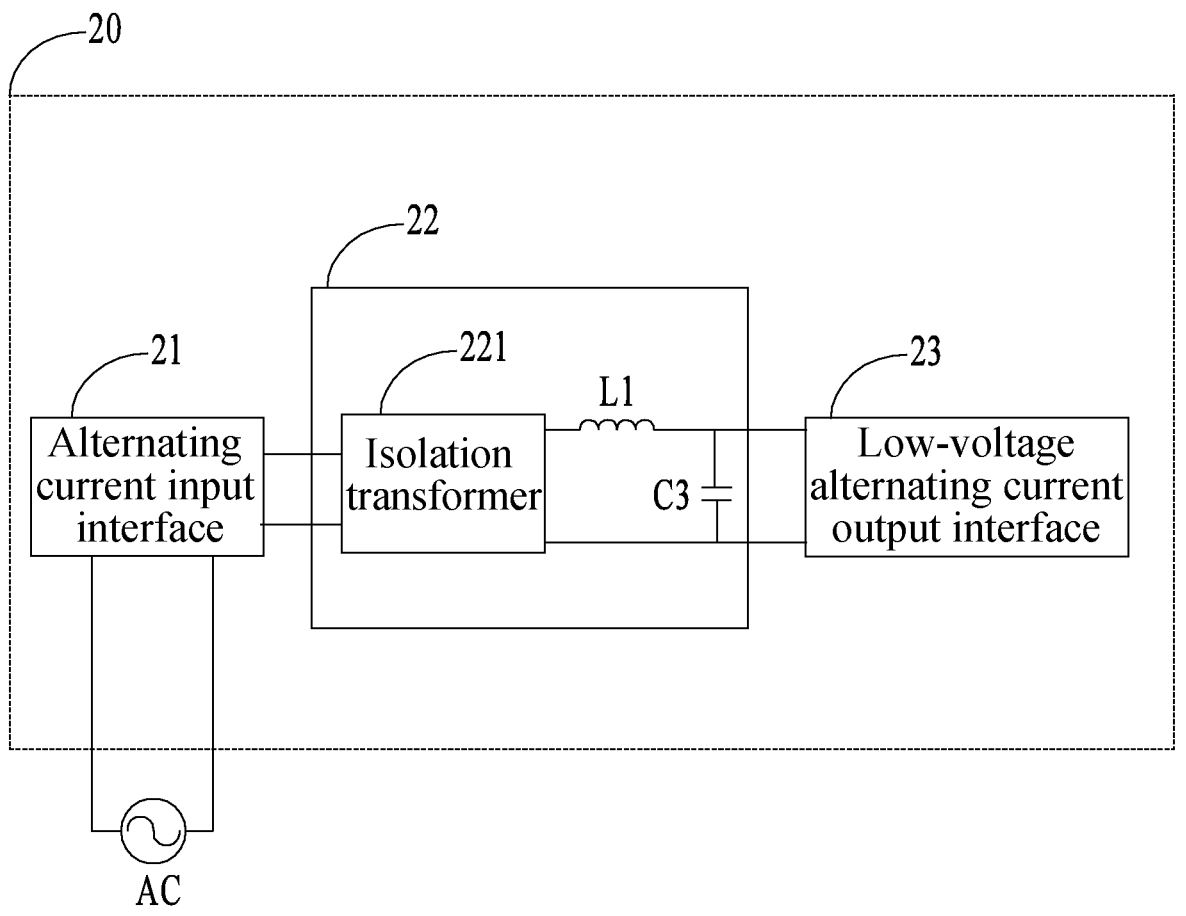
FIG. 4 is a circuit block diagram of an adapter of the self-driving device system of FIG. 1.

FIG. 4 shows a circuit block diagram of the adapter 20. The adapter 20 is connected to the charging station 30 to deliver electrical energy to the charging station 30. The adapter 20 includes an alternating current input interface 21, a transformer isolation circuit 22 and a low-voltage alternating current output interface 23. Specifically, the alternating current input interface 21 is configured to receive the alternating current. In some embodiments, the alternating current input interface 21 is connected to a power plug. The power plug is plugged into an alternating current socket to receive the utility power. The value range of the alternating current received by the alternating current input interface 21 is 100 V to 240 V or 90 V to 264 V. The transformer isolation circuit 22 is electrically connected to the alternating current input interface 21 to convert the utility power to a low-voltage alternating current. The range of the voltage value of the low-voltage alternating current is 20 V to 60 V. Optionally, the voltage value of the low-voltage alternating current is set to 24 V, 28 V or 56 V. Specifically, the low-voltage alternating current may be one of a square wave alternating current, a sinusoidal alternating current or a modified sine wave alternating current. The low-voltage alternating current output interface 23 is electrically connected to the transformer isolation circuit 22 to output the low-voltage alternating current. The alternating current input interface 21 is electrically connected to the low-voltage alternating current output interface 23 to receive the low-voltage alternating current to the charging station 30. Specifically, the transformer isolation circuit 22 may be configured as an isolation transformer or a switching power supply circuit to achieve the function.

The transformer isolation circuit 22 is connected between the alternating current input interface 21 and the low-voltage alternating current output interface 23 and configured to convert the utility power to a low-voltage alternating current. Then, the low-voltage alternating current is transmitted unidirectionally to the charging station 30 through the low-voltage alternating current output interface 23. The transformer isolation circuit 22 includes an isolation transformer 221, a third capacitor C3 and a first inductance L1. The transformer isolation circuit 22 is disposed between the alternating current input interface 21 and the low-voltage alternating current output interface 23 to convert the utility power to a low-voltage alternating current, and then the low-voltage alternating current is transmitted unidirectionally to the charging station 30 through the low-voltage alternating current output interface 23 so that the influence of the high current on the intelligent mowing system can be avoided, and the electrical safety of users can be protected.

Specifically, the input interface 31 of the charging station 30 receives the low-voltage alternating current converted by the adapter 20. The input interface 31 is directly connected to the charging interface 13 of the intelligent mower 10 through the first output interface 32. In one embodiment, the input interface 31 receives a low-voltage alternating current and transmits the low-voltage alternating current to the first output interface 32 through a PCB. In another embodiment, the low-voltage alternating current output interface 23 of the adapter 20 is connected to the first output terminal 321 and the second output terminal 322 of the first output interface 32 to output the low-voltage alternating current to a self-driving device 10. The charging interface 13 of the intelligent mower 10 receives the low-voltage alternating current. Then, the low-voltage alternating current is rectified and filtered through the charging power circuit 14. Specifically, the charging power circuit 14 includes a rectifier circuit 141 and a filter circuit 142. The charging power circuit 14 is configured to convert the low-voltage alternating current to a direct current and outputs the direct current to the charging output interface 19 to charge the battery set 12. In some embodiments, the rectifier circuit 141 includes at least one rectifier bridge, and the filter circuit 142 includes at least one filter capacitor. The low-voltage alternating current is one of a square wave alternating current, a sinusoidal alternating current or a modified sine wave alternating current.

What is claimed is:

1. A self-driving device system, comprising:
a self-driving device capable of automatically walking and operating in a work area;
a charging station configured to charge the self-driving device; and
an adapter configured to convert utility power to a low-voltage alternating current and output the low-voltage alternating current to the charging station;
wherein the charging station comprises:
an input interface connected to the adapter and configured to receive the low-voltage alternating current output by the adapter; and
a first output interface connected to the self-driving device and configured to output the low-voltage alternating current to the self-driving device; and
the self-driving device comprises:
a charging interface connected to the first output interface of the charging station to receive the low-voltage alternating current.

2. The self-driving device system according to claim 1, wherein the input interface of the charging station is electrically connected to the first output interface of the charging station by a printed circuit board (PCB).

3. The self-driving device system according to claim 1, wherein the self-driving device further comprises a charging power circuit and the charging power circuit is connected to the charging interface to convert the low-voltage alternating current to a low-voltage direct current.

4. The self-driving device system according to claim 3, wherein the self-driving device further comprises a charging output interface and a battery set and the charging output interface is connected to the charging power circuit to output the low-voltage direct current and configured to charge the battery set of the self-driving device.

5. The self-driving device system according to claim 4, wherein the self-driving device further comprises a charging control module configured to adjust an input voltage and an output voltage of the charging power circuit to adapt to the battery set.

6. The self-driving device system according to claim 3, wherein the charging power circuit comprises at least a rectifier circuit and a filter circuit.

7. The self-driving device system according to claim 6, wherein the rectifier circuit comprises at least a rectifier bridge and the filter circuit comprises at least an electrolytic capacitor.

8. The self-driving device system according to claim 1, wherein the adapter comprises an alternating current input interface, a transformer isolation circuit, and a low-voltage alternating current output interface.

9. The self-driving device system according to claim 8, wherein the transformer isolation circuit comprises at least one of a switching power supply or an isolation transformer.

10. The self-driving device system according to claim 8, wherein the low-voltage alternating current output interface is electrically connected to the input interface of the charging station and configured to output the low-voltage alternating current to the charging station.

11. The self-driving device system according to claim 1, wherein the low-voltage alternating current may be one of a square wave alternating current, a sinusoidal alternating current, or a modified sine wave alternating current.

12. The self-driving device system according to claim 1, wherein a range of a voltage value of the low-voltage alternating current is greater than or equal to 20 V and less than or equal to 60 V.

13. The self-driving device system according to claim 1, wherein the self-driving device system further comprises a boundary line configured to plan the work area of the self-driving device.

14. The self-driving device system according to claim 13, wherein the charging station further comprises a boundary power module configured to convert the low-voltage alternating current received by the input interface to a direct current and a second output interface connected to the boundary power module and configured to output the direct current to supply power to the boundary line.

15. The self-driving device system according to claim 1, wherein the self-driving device further comprises a battery set configured to provide electrical energy for the self-driving device and comprising one or more pluggable battery packs, and the one or more pluggable battery packs are capable of providing a source of energy for other power tools.

16. A self-driving device system, comprising:
a self-driving device capable of walking and operating in a work area;
a charging station configured to charge the self-driving device; and
an adapter configured to convert utility power to a low-voltage alternating current and output the low-voltage alternating current to the charging station;
wherein the charging station comprises:
an input interface connected to the adapter and configured to receive the low-voltage alternating current output by the adapter; and
a first output interface connected to the self-driving device and configured to output the low-voltage alternating current to the self-driving device.

17. The self-driving device system according to claim 16, wherein the self-driving device comprises a charging interface, a charging power circuit, and a charging output interface, the charging interface is connected to the first output interface of the charging station to receive the low-voltage alternating current, the charging power circuit is connected to the charging interface to convert the low-voltage alternating current received by the charging interface to a low-voltage direct current, and the charging output interface is connected to the charging power circuit to output the low-voltage direct current to power the self-driving device.

18. The self-driving device system according to claim 16, wherein a range of a voltage value of the low-voltage alternating current is greater than or equal to 20 V and less than or equal to 60 V.

\* \* \* \* \*